United States Patent
Ham et al.

(10) Patent No.: US 9,810,181 B2
(45) Date of Patent: Nov. 7, 2017

(54) HEATER DEVICE OF DIESEL FUEL FILTER

(71) Applicant: HYUNDAI MOTOR COMPANY, Seoul (KR)

(72) Inventors: Chang Ho Ham, Ansan-si (KR); Dong Myoung Ryoo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 105 days.

(21) Appl. No.: 14/717,905

(22) Filed: May 20, 2015

(65) Prior Publication Data

US 2016/0138534 A1    May 19, 2016

(30) Foreign Application Priority Data

Nov. 14, 2014  (KR) .................... 10-2014-0158996

(51) Int. Cl.
   *F02M 31/125*     (2006.01)
   *F02M 37/22*      (2006.01)

(52) U.S. Cl.
   CPC ........ *F02M 31/125* (2013.01); *F02M 37/223* (2013.01); *Y02T 10/126* (2013.01)

(58) Field of Classification Search
   USPC ........................................................ 123/557
   See application file for complete search history.

(56) References Cited

U.S. PATENT DOCUMENTS

| | | | | |
|---|---|---|---|---|
| 4,477,345 A | * | 10/1984 | Szlaga, Jr. ......... | B01D 17/0214 210/130 |
| 4,629,560 A | * | 12/1986 | Harris ................. | B01D 36/003 123/557 |
| 4,881,508 A | * | 11/1989 | Van Den Elst ........... | F23K 5/20 123/549 |
| 5,547,572 A | * | 8/1996 | Stone ................. | B01D 17/0211 210/232 |
| 2005/0084256 A1 | * | 4/2005 | Wieczorek ............. | B01D 35/18 392/485 |
| 2009/0162041 A1 | * | 6/2009 | Beetz ................... | F02M 31/125 392/485 |
| 2012/0160749 A1 | * | 6/2012 | Girondi .................. | B01D 35/18 210/149 |
| 2014/0165973 A1 | * | 6/2014 | Park ..................... | F02M 31/125 123/558 |

FOREIGN PATENT DOCUMENTS

| | | |
|---|---|---|
| JP | 2012-532280 A | 12/2012 |
| KR | 10-2007-0113703 A | 11/2007 |
| KR | 10-0883093 B1 | 2/2009 |
| KR | 10-2010-0050267 A | 5/2010 |
| KR | 10-1283030 B1 | 7/2013 |
| KR | 10-1405224 B1 | 6/2014 |

* cited by examiner

*Primary Examiner* — Joseph Dallo
*Assistant Examiner* — Scott A Reinbold
(74) *Attorney, Agent, or Firm* — McDermott Will & Emery LLP

(57) ABSTRACT

A heater device of a diesel fuel filter may include a heater housing inserted into a diesel fuel filter, and a heater portion inserted into the heater housing. A plurality of flow-path regions may be formed in the heater portion such that heated fuel passes through the heater portion. Accordingly, heat is transmitted directly from a heater portion including a plurality of heat radiating plates and PTC devices, and thus fuel is rapidly heated and a fuel transfer velocity is increased so as to improve engine starting performance at low temperature, thereby improving marketability and convenience.

8 Claims, 6 Drawing Sheets

HEATER DEVICE OF DIESEL FUEL FILTER

CROSS-REFERENCE TO RELATED APPLICATION

This application is based on and claims the benefit of priority to Korean Patent Application No. 10-2014-0158996, filed on Nov. 14, 2014 in the Korean Intellectual Property Office, the disclosure of which is incorporated herein in its entirety by reference.

TECHNICAL FIELD

The present disclosure relates to a heater device of a diesel fuel filter, and more particularly, to a heater device of a diesel fuel filter, for smoothly transferring fuel by sufficiently circulating fuel introduced to a filter around a heater.

BACKGROUND

In general, diesel fuel has the feature whereby paraffin components are waxed at low temperature.

Thus, waxed components in diesel fuel wall up a diesel filter, and thus the possibility of engine starting failure increases due to fuel feeding failure.

To overcome this issue, an electronic type positive temperature coefficient heater (PTC) is used at a filter inlet side so as to heat fuel at low temperature in order to enhance diesel liquidity and start ability at low temperature.

A diesel fuel filter may be classified into a cell type diesel fuel filter with a very wide shape and a bar type diesel fuel filter with a long shape.

However, the cell type diesel fuel filter is configured in such a way that PTC devices are arranged in a circular pattern to form a plate shape and is generally integrated into a diesel filter, and thus it is difficult to detach the PTC devices from the diesel filter.

In addition, the bar type diesel fuel filter is configured in such a way that PTC devices are arranged in line to form a long bar shape, and thus it is relatively easy to detach the PTC devices from the diesel filter. However, it is difficult to ensure heating capacity and performance due to restriction in a shape.

RELATED ART DOCUMENT

Patent Document 1) Korean Patent No. 10-1283030

SUMMARY

The present disclosure has been made to solve the above-mentioned problems occurring in the prior art while advantages achieved by the prior art are maintained intact.

An aspect of the present disclosure provides a heater device of a diesel fuel filter, more particularly, a heater device of a diesel fuel filter, for smoothly transferring fuel by sufficiently circulating fuel introduced to a filter around a heater.

According to an exemplary embodiment of the present disclosure, a heater device of a diesel fuel filter includes a heater housing inserted into a diesel fuel filter, and a heater portion inserted into the heater housing. A plurality of flow-path regions may be formed in the heater portion such that heated fuel passes through the heater portion.

The heater housing may include a space portion formed therein, and the heater portion may be inserted into the space portion.

The heater housing may include an inlet to which fuel is introduced, and an outlet through which fuel passing through the heater portion is discharged.

The heater housing may include a lower plate disposed below the heater housing and configured to fix the heater portion.

The heater portion may include a first heat radiating plate and a second heat radiating plate that are vertically arranged and spaced apart from each other by a predetermined interval, and a plurality of PTC devices disposed between the first heat radiating plate and the second heat radiating plate and configured to generate heat.

The heater portion may further include a first flow-path region formed between a space portion of the heater housing and an external side of the first heat radiating plate, a second flow-path region formed between the space portion of the heater housing and an external side of the second heat radiating plate, and a third flow-path region formed between the first heat radiating plate and the second heat radiating plate.

The heater device may further include an incision portion formed in the second heat radiating plate between the second flow-path region and the third flow-path region.

Fuel introduced through an inlet of the heater housing may be discharged through an outlet of the heater housing through the first flow-path region, the second flow-path region, and the third flow-path region.

According to another exemplary embodiment of the present disclosure, a heater device of a fuel filter may include a heater housing inserted into the fuel filter and including an inlet to which fuel is injected, and an outlet through which the fuel is discharged; a plurality of flow-path regions forming a zigzagged fuel path, and including a first flow-path region connected to the inlet, a third flow-path region connected to the outlet, and a second flow-path region connecting the first and third flow-path regions to each other; and a heater portion inserted into the heater housing and including a plurality of heaters arranged on the third flow-path region and substantially parallel to a direction from the inlet to the outlet.

The heater portion may further include first and second heat radiating plates. The plurality of heaters and the third flow-path region may be interposed between the first and second heat radiating plates. The first heat radiating plate may be interposed between the first flow-path region and the third flow-path region. The second heat radiating plate may be interposed between the second flow-path region and the third flow-path region.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments will now be described more fully with reference to the accompanying drawings.

As illustrated in FIGS. 1 through 6, a heater device of a diesel fuel filter according to the present disclosure includes a heater housing 100 and a heater portion 200 inserted into the heater housing 100 and heating fuel.

Figure 1:
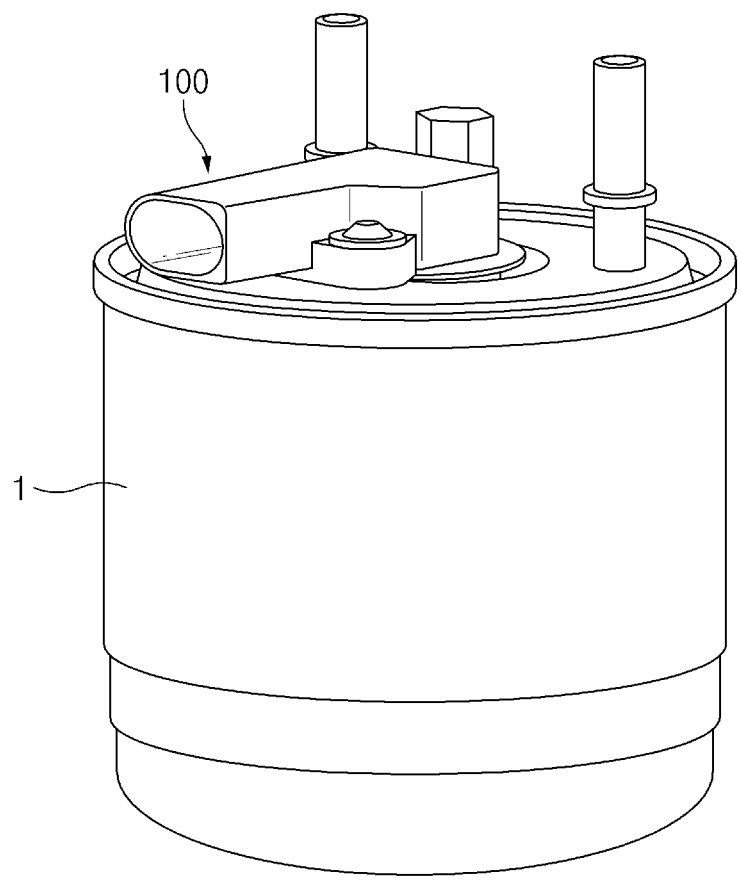
FIG. 1 is a diagram of a diesel fuel filter according to the present disclosure.
Figure 2:
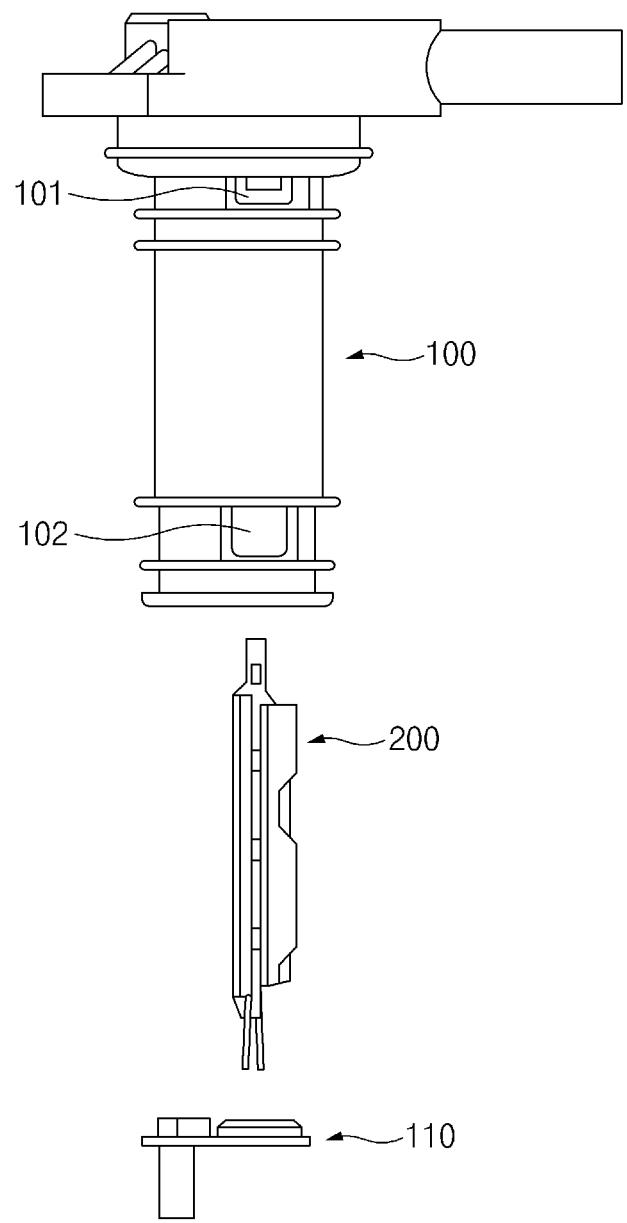
FIG. 2 is an exploded perspective view of a heater device of a diesel fuel filter according to the present disclosure.

As illustrated in FIGS. 1 and 2, the heater housing 100 forms an outer appearance of the heater device inserted into a diesel fuel filter 1, is formed in a bar type, and is vertically inserted into and installed in the diesel fuel filter 1.

In this case, a space portion (not shown) may be formed in the heater housing 100 and thus the heater portion 200 that will be described below may be inserted into the space portion.

Figure 3:
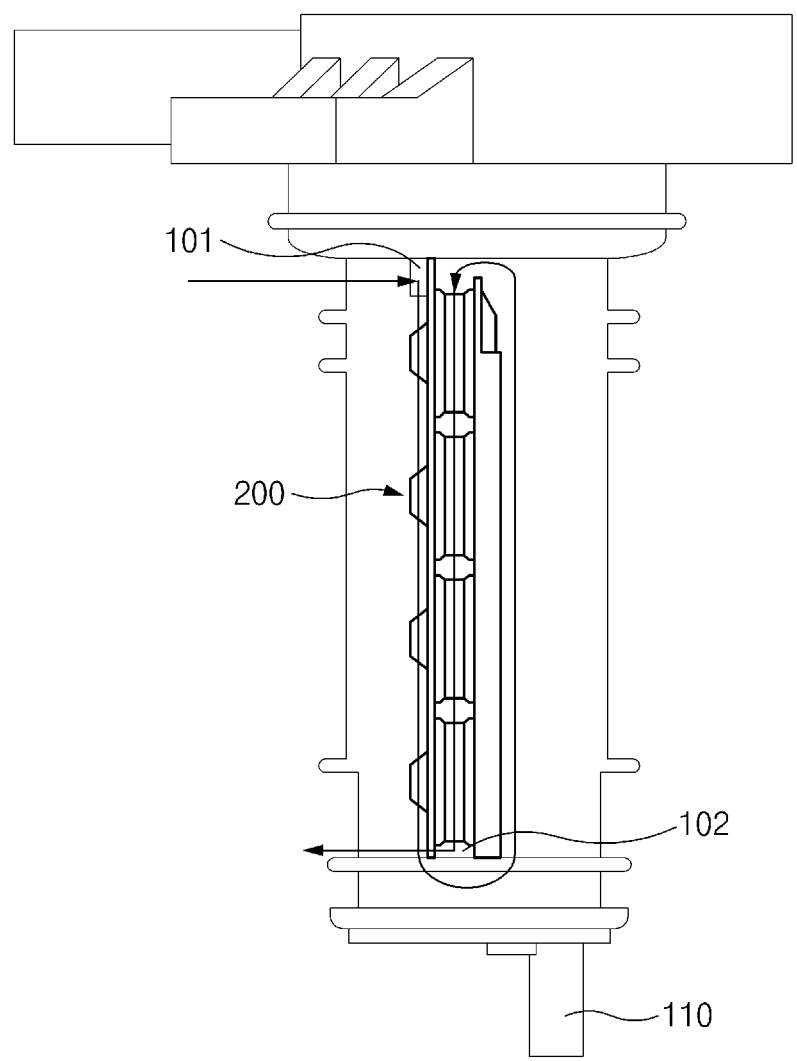
FIG. 3 is a diagram of a heater device of a diesel fuel filter according to the present disclosure.

As illustrated in FIGS. 2 and 3, an inlet 101 may be formed at an upper portion of the space portion (not shown) of the heater housing 100 so as to introduce fuel into the space portion of the heater housing 100, and an outlet 102 may be formed at a lower portion of the space portion so as to discharge heated fuel through the heater portion 200.

The heater portion 200 is inserted into the heater housing 100 and heats the fuel introduced through the inlet 101.

In this case, the heater portion 200 may facilitate heating of fuel by forming a plurality of flow-path regions so as to pass fuel through each flow-path region.

Figure 4:
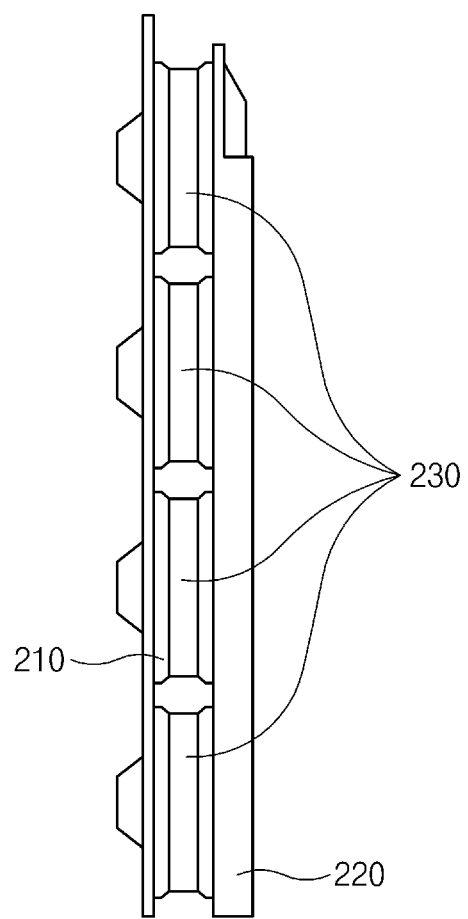
FIG. 4 is a diagram of a heater portion of a diesel fuel filter according to the present disclosure.
Figure 5:
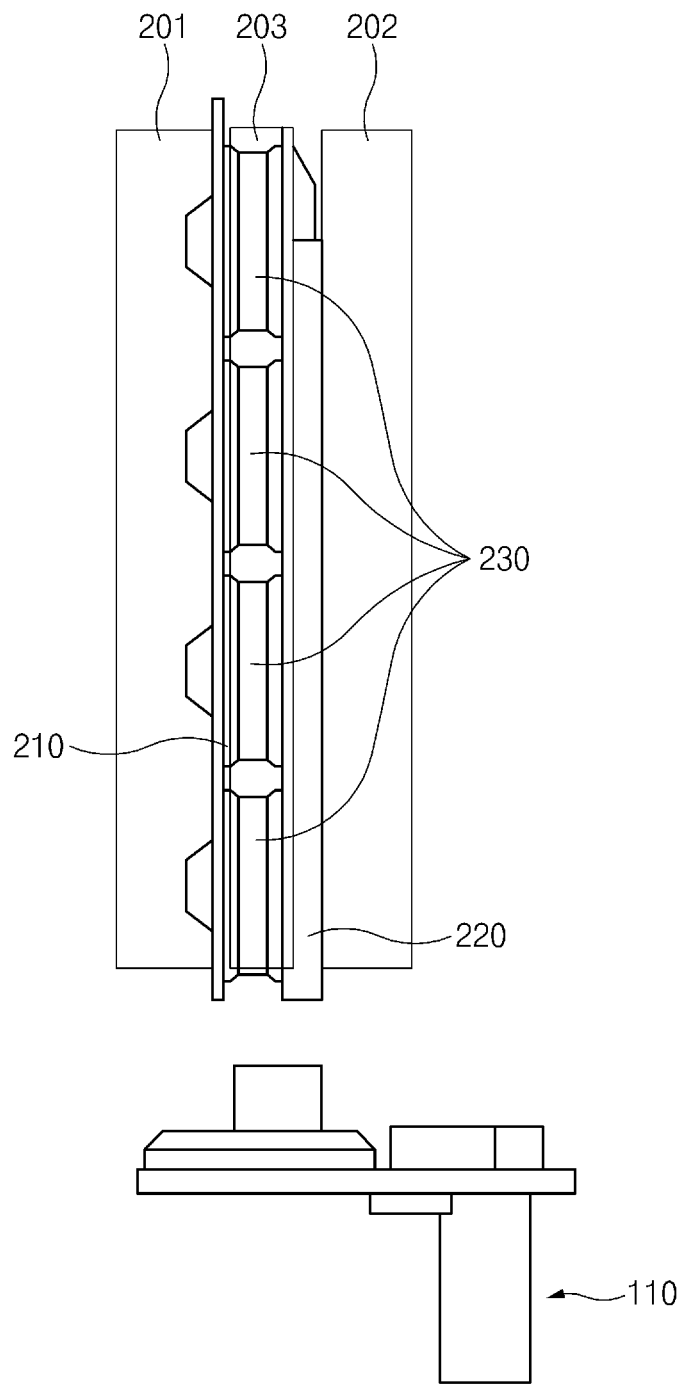
FIG. 5 is a diagram of a flow-path region of a heater portion of a diesel fuel filter according to the present disclosure.

To this end, as illustrated in FIGS. 3 through 5, the heater portion 200 may include a first heat radiating plate 210 and a second heat radiating plate 220 that are vertically arranged and spaced apart from each other by a predetermined interval, and a plurality of PTC devices 230 disposed between the first heat radiating plate 210 and the second heat radiating plate 220 and generating heat.

In addition, the heater portion 200 may be configured in such a way that a first flow-path region 201 is formed between the space portion (not shown) of the heater housing 100 and an external side of the first heat radiating plate 210, a second flow-path region 202 is formed between the space portion (not shown) of the heater housing 100 and an external side of the second heat radiating plate 220, and a third flow-path region 203 is formed between the first heat radiating plate 210 and the second heat radiating plate 220.

In this case, fuel introduced through the inlet 101 of the heater housing 100 may be discharged through the outlet 102 of the heater housing 100 through the first flow-path region 201, the second flow-path region 202, and the third flow-path region 203.

Here, the size of the inlet 101 may be determined to be fit to a passage of the first flow-path region 201 so as to introduce fuel only to the first flow-path region 201, and the size of the outlet 102 may be determined to the fit to a passage of the third flow-path region 203 so as to discharge fuel only through the third flow-path region 203.

As a result, as shown in FIG. 3 and FIG. 5, the fuel introduced through the inlet 101 of the heater housing 100 may be transmitted to the first flow-path region 201 formed only in the first heat radiating plate 210 and may be primarily heated, the primarily heated fuel may be transmitted to the second flow-path region 202 formed only in the second heat radiating plate 220 and may be secondarily heated, and the secondarily heated fuel may be transmitted to the third flow-path region 203 for heating fuel by the first heat radiating plate 210 and the second heat radiating plate 220 at highest temperature, thereby maximizing heat transfer efficiency. The first through third flow-path regions 201 through 203 may be formed in a zigzag shape. The plurality of PTC devices 230 may be arranged on the third flow-path region 203 and substantially parallel to a direction from the inlet 101 to the outlet 102. The plurality of PTC devices 230 and the third flow-path region 203 may be interposed between the first and second heat radiating plates 210 and 220. The first heat radiating plate 210 may be interposed between the first flow-path region 201 and the third flow-path region 203. The second heat radiating plate 220 may be interposed between the second flow-path region 202 and the third flow-path region 203.

Figure 6:
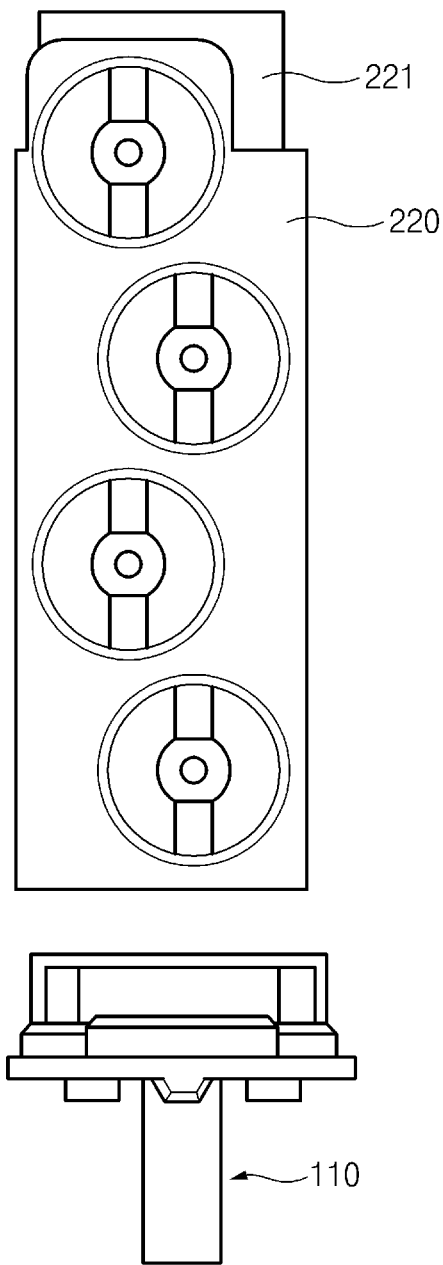
FIG. 6 is a diagram illustrating an incision portion formed in a second heat radiating plate of a heater device of a diesel fuel filter according to the present disclosure.

As illustrated in FIG. 6, an incision portion 221 may be formed at an upper end of the second heat radiating plate 220 between the second flow-path region 202 and the third flow-path region 203 so as to facilitate transmission of the fuel of the second flow-path region 202 to the third flow-path region 203.

In addition, the heater housing 100 may include a lower plate 110 disposed below the heater housing 100 and for fixing the heater portion 200.

In this case, primary to secondary connection path shapes may be applied to the lower plate 110 of the heater housing 100 and an upper portion of a heat radiating plate may be partially cut to function as secondary to tertiary connection paths.

Likewise, the heater device according to the present disclosure may be configured by the heater housing 100 inserted into the diesel fuel filter 1 and the heater portion 200 which is inserted into the heater housing 100 and includes a plurality of flow-path regions through which heated fuel passes. Accordingly, an internal space of the heater housing 100 may be divided into the first flow-path region 201, the second flow-path region 202, and the third flow-path region 203 using the first heat radiating plate 210 and the second heat radiating plate 220 that are closely inserted, and connection paths through which fuel passes may be applied to upper and lower sides of the respective regions such that the flow-paths pass around a heater, thereby ensuring sufficient time for transmitting heat of the heater to fuel.

That is, the internal space of the heater may be divided into three flow-path regions using a plurality of heat radiating plates such that fuel passes through the first flow-path region 201, the second flow-path region 202, and the third flow-path region 203 in the stated order, and thus an intermediate region, which is hottest due to being closest to the heater, is disposed at a last portion of a flow path, thereby maximizing heat transfer efficiency.

As described above, according to the present disclosure, heat may be transmitted directly from a heater portion including a plurality of heat radiating plates and PTC devices, and thus fuel may be rapidly heated and a fuel transfer velocity may be increased so as to improve engine starting performance at low temperature, thereby improving marketability and convenience.

While the present disclosure has been particularly shown and described with reference to exemplary embodiments and drawings thereof, it will be understood by those of ordinary skill in the art that various changes in form and details may be made therein without departing from the spirit of the present disclosure as defined by the following claims.

What is claimed is:

1. A heater device of a diesel fuel filter, the heater device comprising:

a heater housing inserted into the diesel fuel filter; and a heater portion inserted into the heater housing, wherein a plurality of flow-path regions are formed in the heater portion such that heated fuel passes through the heater portion, wherein the heater portion includes:
- a first heat radiating plate and a second heat radiating plate that are vertically arranged and spaced apart from each other by a predetermined interval;
- a first flow-path region formed between a space portion of the heater housing and an external side of the first heat radiating plate;
- a second flow-path region formed between the space portion of the heater housing and an external side of the second heat radiating plate; and
- a third flow-path region formed between the first heat radiating plate and the second heat radiating plate, and the heater device further comprises an incision portion formed in the second heat radiating plate between the second flow-path region and the third flow-path region, fuel passes through in an order of the first flow-path region, the second flow-path region, and the third flow-path region.

2. The heater device according to claim 1, wherein the heater housing includes an inlet to which fuel is introduced, and an outlet through which fuel passing through the heater portion is discharged.

3. The heater device according to claim 1, wherein the heater housing includes a lower plate disposed below the heater housing and configured to fix the heater portion.

4. The heater device according to claim 1, wherein the heater housing includes a space portion formed therein, and the heater portion is inserted into the space portion.

5. The heater device according to claim 4, wherein the heater portion further includes:
- a plurality of positive temperature coefficient (PTC) devices disposed between the first heat radiating plate and the second heat radiating plate and configured to generate heat.

6. The heater device according to claim 1, wherein fuel introduced through an inlet of the heater housing is discharged through an outlet of the heater housing through the first flow-path region, the second flow-path region, and the third flow-path region.

7. A heater device of a fuel filter, the heater device comprising:
- a heater housing inserted into the fuel filter and including an inlet to which fuel is injected, and an outlet through which the fuel is discharged;
- a plurality of flow-path regions forming a zigzagged fuel path, and including a first flow-path region connected to the inlet, a third flow-path region connected to the outlet, and a second flow-path region connecting the first and third flow-path regions to each other;
- a heater portion inserted into the heater housing, and including a plurality of heaters arranged on the third flow-path region and substantially parallel to a direction from the inlet to the outlet and first and second heat radiating plates; and
- an incision portion formed in the second heat radiating plate of the heater portion between the second flow-path region and the third flow-path region, wherein fuel passes through in an order of the first flow-path region, the second flow-path region, and the third flow-path region.

8. The heater device according to claim 7,
wherein the plurality of heaters and the third flow-path region are interposed between the first and second heat radiating plates, the first heat radiating plate is interposed between the first flow-path region and the third flow-path region, and the second heat radiating plate is interposed between the second flow-path region and the third flow-path region.

* * * * *